US006767018B1

(12) United States Patent
Daniels et al.

(10) Patent No.: US 6,767,018 B1
(45) Date of Patent: Jul. 27, 2004

(54) MACHINABLE DATUM FOR A SELF-CENTERING VACUUM FIXTURE

(75) Inventors: Arthur S. Daniels, Rockaway, NJ (US); James Pham, Randolph, NJ (US); Ernest L. Baker, Wantage, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/064,567

(22) Filed: Jul. 26, 2002

(51) Int. Cl.[7] .............................................. B23B 31/30
(52) U.S. Cl. .......................... 279/3; 269/21; 279/156; 82/168
(58) Field of Search .................... 279/3, 153, 156, 279/133; 269/21; 294/64.1; 82/168, 170

(56) References Cited

U.S. PATENT DOCUMENTS

| | | | | |
|---|---|---|---|---|
| 2,529,331 A | * | 11/1950 | Ellis et al. ...................... | 279/3 |
| 3,147,017 A | * | 9/1964 | Dunham ........................ | 279/3 |
| 3,236,533 A | * | 2/1966 | Mullion ........................ | 279/3 |
| 3,328,042 A | * | 6/1967 | Mallory ........................ | 279/3 |
| 5,944,330 A | * | 8/1999 | Zajac .......................... | 279/151 |

* cited by examiner

*Primary Examiner*—Daniel W. Howell
(74) *Attorney, Agent, or Firm*—Robert C. Beam; John F. Moran

(57) ABSTRACT

A machinable datum for use in a vacuum fixture is disclosed. The vacuum fixture comprises: a cylindrical stationary mandrel portion having a central cavity therethrough, and comprising: a first end mountable to a machine tool, such as a lathe; a second end terminating in a contact datum intended for contact with a workpiece; and, vacuum means capable of introducing a vacuum into a space between said contact datum and said workpiece; a cylindrical plunger portion residing within said central cavity of said cylindrical stationary mandrel portion, said cylindrical plunger portion comprising: a first end approximately coextensive with said first end of said stationary mandrel portion, comprising a biasing spring; a plunger comprising a cylindrical plunger residing within said central cavity of said cylindrical stationary mandrel portion, and biased away from said first end of said stationary mandrel portion by said biasing spring; and, a second end terminating in a contact datum intended for contact with a workpiece; and wherein at least one of said contact datums are comprised of an easily machinable material which can be shaped to facilitate contact with a workpiece.

6 Claims, 3 Drawing Sheets

US 6,767,018 B1

MACHINABLE DATUM FOR A SELF-CENTERING VACUUM FIXTURE

FEDERAL RESEARCH STATEMENT

[The invention described herein may be made, used or licensed by or for the United States Government without the payment of any royalties thereon or therefore.]

BACKGROUND OF INVENTION

1. Field of the Invention

The present invention relates to an improved means for affixing an article in a self-centering vacuum fixture, for use in machining the article on a lathe or the like. In particular, the present invention relates to a machinable datum for use in a vacuum fixture, in which the vacuum fixture comprises:

a cylindrical stationary mandrel portion having a central cavity therethrough, and comprising:
  a first end mountable to a machine tool, such as a lathe;
  a second end terminating in a contact datum intended for contact with a workpiece; and,
  vacuum means capable of introducing a vacuum into a space between said contact datum and said workpiece;
a cylindrical plunger portion residing within said central cavity of said cylindrical stationary mandrel portion, said cylindrical plunger portion comprising:
  a first end approximately coextensive with said first end of said stationary mandrel portion, comprising a biasing spring;
  a plunger comprising a cylindrical plunger residing within said central cavity of said cylindrical stationary mandrel portion, and biased away from said first end of said stationary mandrel portion by said biasing spring;
  and, a second end terminating in a contact datum intended for contact with a workpiece; and wherein at least one of said contact datums are comprised of an easily machinable material which can be shaped to facilitate contact with a workpiece.

2. Description of Related Art

Advanced high performance shaped-charge warheads are used in a variety of military systems as the mechanism to defeat a wide variety of military targets. The basic shaped-charge warhead consists of a shaped charge liner, usually conical in shape, inserted into an explosive charge. Upon detonation, the liner collapses on its axis causing a high-speed jet of liner material to be propelled from the front of the warhead. The outside contour of the explosive charge may take on a variety of shapes and configurations to either enhance warhead performance, or to fit within the confines of a particular munitions system. Various other components may be incorporated within the explosive charge to shape or alter the passing detonation wave in order to enhance performance.

For high performance shaped-charge warheads, the explosive charge is fabricated to near net shape and then machined on a CNC lathe to final configuration. The ability to solidly hold the warhead in the lathe, and the accuracy with which the warhead is spun on the centerline of the shaped-charge liner dictate how precisely the overall dimensions of the warhead can be machined. The precision to which the warhead can be machined has a significant effect on penetration performance since any asymmetry in the warhead will cause the shaped-charge liner to collapse off axis and skew the resultant jet formation. With the continued call for lighter, smaller and more lethal warheads, the need for more exacting machining and assembly procedures has become even more critical. It is extremely difficult to meet the exacting tolerances required using current methods to fixture the warhead in the lathe.

In general, warheads can be fixtured in a lathe by mechanical or vacuum methods. Warheads that are machined using mechanical fixturing devices, such as a three-jaw chuck, are relatively inaccurate, since they rely on the outside contour of the warhead for alignment. There are also several vacuum fixturing techniques for machining warheads that are more accurate than mechanical means. However, each of these vacuum fixturing techniques has certain drawbacks.

One method of vacuum fixturing involves holding the warhead on a vacuum plate, using the liner face for alignment. In doing so, however, accuracy is dependent on strict perpendicularity between the axis of the shaped-charge liner and the face of the shaped-charge liner. It is further dependent upon the degree to which the warhead can be manually centered on the vacuum plate.

A second method involves machining a vacuum mandrel that fits inside the shaped-charge liner. Although the mandrel spins true because it was machined on the same lathe, it is difficult to match the exact contour of any individual liner, let alone a group of liners. Any misalignment will have a tendency to allow the warhead to move on the fixture, thus reducing accuracy.

A third method involves a spring-loaded vacuum fixture that uses two datum plates to align the warhead on its own axis. Although substantially more accurate than the other methods described, this method still has two drawbacks which limit its effectiveness. The first is that heretofore the datum plates have each been fashioned to accommodate a particular type of shaped-charge liner, which has created resulted in a high cost for their manufacture. Secondly, each time a change in the manufacturing operation is desired, such as a change from the manufacture of one kind of shaped-charge liner to another, the fixture must be changed. This requires the installation of a new fixture or a change in the datum associated with the existing fixture, and the fixture must be manually realigned and trued before manufacturing can commence.

SUMMARY OF INVENTION

Objects of the Present Invention

It is an object of the present invention to provide datums for a self-centering vacuum fixture that can easily be fashioned to accommodate a variety of objects, such as different shaped-charge liners.

It is another object of the present invention to provide datums for a self-centering vacuum fixture that can be employed without the realignment and truing problems that have been associated with vacuum fixtures.

The other objects, features and advantages of the present invention will become more apparent in light of the following detailed description of the preferred embodiment thereof.

According to the preferred embodiment of the present invention, there is provided a machinable datum for use in a vacuum fixture, which vacuum fixture comprises:

a cylindrical stationary mandrel portion having a central cavity therethrough, and comprising:
  a first end mountable to a machine tool, such as a lathe;
  a second end terminating in a contact datum intended for contact with a workpiece; and,
  vacuum means capable of introducing a vacuum into a space between said contact datum and said workpiece;

a cylindrical plunger portion residing within said central cavity of said cylindrical stationary mandrel portion, said cylindrical plunger portion comprising:
a first end approximately coextensive with said first end of said stationary mandrel portion, comprising a biasing spring;
a plunger comprising a cylindrical plunger residing within said central cavity of said cylindrical stationary mandrel portion, and biased away from said first end of said stationary mandrel portion by said biasing spring; and,
a second end terminating in a contact datum intended for contact with a workpiece;
and wherein at least one of said contact datums are comprised of an easily machinable material which can be shaped to facilitate contact with a workpiece.

DETAILED DESCRIPTION

Figure 1:
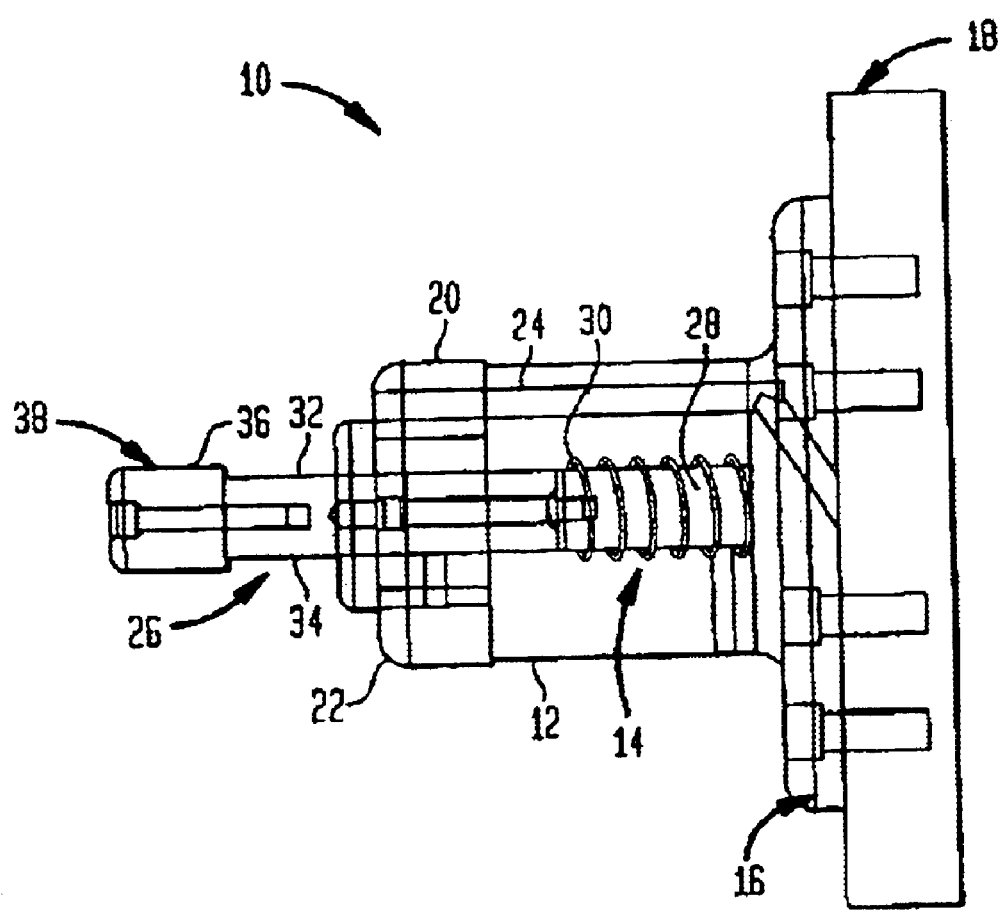
FIG. 1 shows a vacuum fixture with the machinable datums of the present invention in cross-section.

FIG. 1 shows a vacuum fixture 10 as envisioned in the present invention. This vacuum fixture 10 comprises a cylindrical stationary mandrel portion 12 having a central cavity 14 therethrough. The cylindrical stationary mandrel portion 12 further comprises a first end 16 mountable to a machine tool 18, such as a lathe.

In addition, the cylindrical stationary mandrel portion 12 further comprises a second end 20 terminating in a contact datum 22 intended for contact with a workpiece, as will be shown in greater detain hereinafter.

Further, the cylindrical stationary mandrel 12 also comprises a vacuum means 24 capable of introducing a vacuum into a space between said contact datum 22 and a workpiece.

The vacuum fixture of FIG. 1 further comprises a cylindrical plunger portion 26 residing within the central cavity 14 of said cylindrical stationary mandrel portion 12. This cylindrical plunger portion 26 comprises a first end 28 approximately coextensive with said first end 16 of said cylindrical stationary mandrel portion 12, comprising a biasing spring 30.

The cylindrical plunger portion 26 further comprises a plunger portion 32 comprising a cylindrical plunger 34 residing within the central cavity 14 of the cylindrical stationary mandrel portion 12, and biased away from the first end 16 of the stationary mandrel portion 12 by the biasing spring 30. The plunger portion 32 further comprises a second end 36 terminating in a contact datum 38 intended for contact with a workpiece.

In the present invention, at least one of the contact datums, 22 and 38, are comprised of an easily machinable material that can be shaped to facilitate contact with a workpiece. In practice, this material can be copper, or an alloy thereof, or aluminum, or an alloy thereof, or some similar, easily machinable metal or other material.

The self-centering vacuum fixture 10 with replaceable machinable datums 22 and 38 solves the inherent problems associated with previous warhead holding methods. Instead of a hardened steel datum, The replaceable datums of the present invention are made of a machinable material. The vacuum fixture 10 is mounted to a machine tool, such as a lathe, and the datums 22 and 38 are then machined so that they run true. Manual alignment of a prior art fixture usually produces a Total Indicated Runout (TIR) for each datum of between about five ten-thousandths (0.0005) to one thousandths (0.001) of an inch. By machining and truing the datum on the lathe prior to machining workpieces such as warheads, TIR's of about one ten-thousandth (0.0001) of an inch can be achieved, giving the datums of the present invention a five- to ten-fold increase in accuracy. Since the vacuum fixture 10 is spring biased, and thus self-centering, the wobble associated with a mandrel is eliminated. In addition, since the datums 22 and 38 are replaceable, new ones can be made easily to fit any size warhead, thus eliminating the need for the expensive fabrication and inventorying of multiple fixtures to accommodate different warheads.

Figure 2:
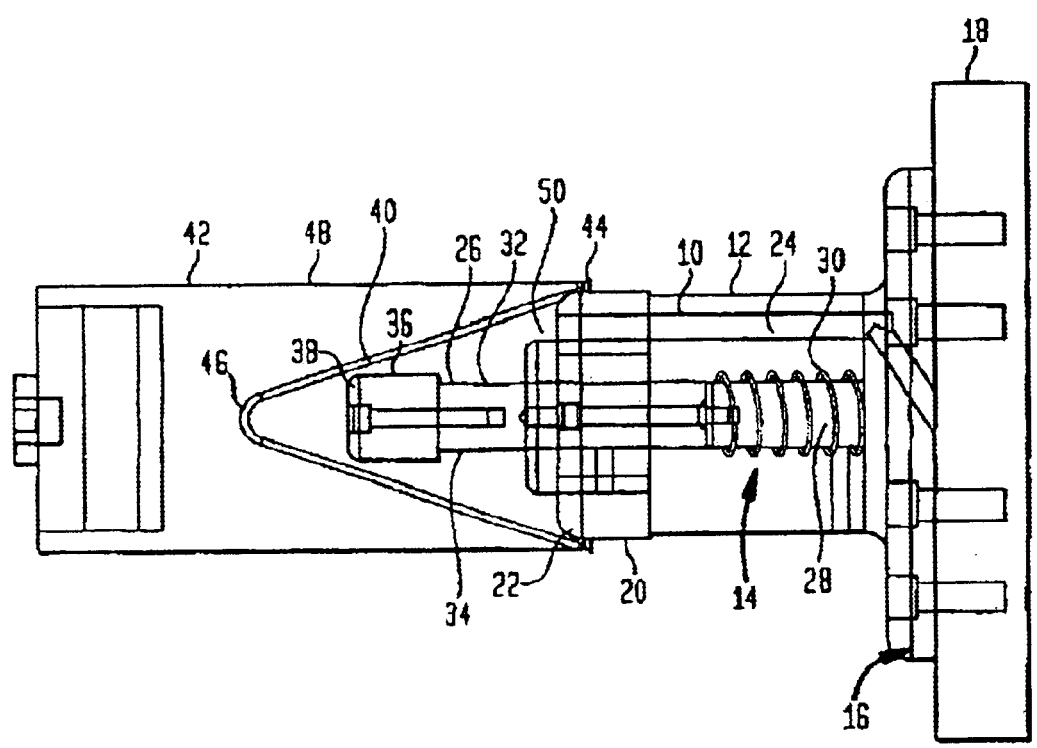
FIG. 2 shows a cross-sectional view of a typical shaped-charge liner and machinable explosive charge, operatively mounted on the vacuum fixture of FIG. 1.

FIG. 2 shows a cross-sectional view of a typical machinable warhead 48, having a shaped-charge liner 40 and machinable explosive charge 42, operatively mounted on the vacuum fixture 10 of FIG. 1. In this view, the contact datum 22 is in contact with the shaped-charge liner 40 near its outer periphery 44, while contact datum 38 is in contact with the shaped-charge liner 40 in the vicinity of its base 46.

In practice, the self-centering vacuum fixture 10 with replaceable machinable datums 22 and 38 is typically bolted on to an adapter plate and the attached to the spindle of a lathe. The vacuum fixture 10 is then spun in the lathe and the machinable datums 22 and 38 are machined and trued with a lathe tool. The shape, diameter, edge contour, and distance between the datums 22 and 38 are selected based on the shape of the shaped-charge liner 40 of the warhead 48 to be machined. New datums can be machined to accommodate any shape for the shaped-charge liner 40 of a warhead 48, or even any size of warhead. The machinable warhead 48 is then placed over the vacuum fixture 10 so that the outer periphery 44 of the shaped-charge liner 40 is seated against the contact datum 22 of the stationary mandrel 12. The contact datum 38 of the spring-biased cylindrical plunger 34 pushes outward until it seats firmly against the base portion 46 of the shaped-charge liner 40. When a vacuum is introduced, through vacuum means 24, into the space 50 between the contact datum 22 and the shaped-charge liner 40, the machinable warhead 48 will be held firmly on the vacuum fixture 10 and it will be centered along the centerline of the shapedcharge liner 40. When the lathe is rotated, the warhead 48 will rotate on the centerline of the shaped-charge liner 40 and the machinable explosive charge 42 can be precision machined around the shaped-charge liner 40.

Figure 3A:
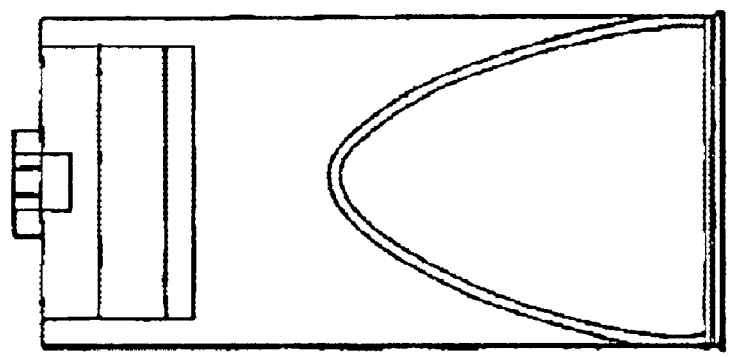
FIGS. 3a, 3b, and 3c show a variety of shaped-charge liners in cross-section, illustrating the range of such liners a vacuum fixture equipped with the machinable datums of the present invention can accommodate.
Figure 3B:
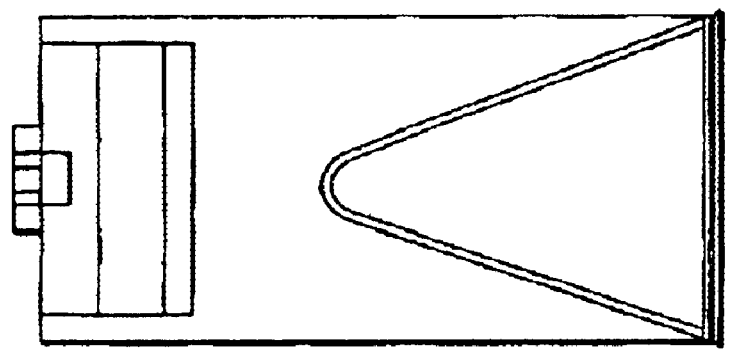
Figure 3C:
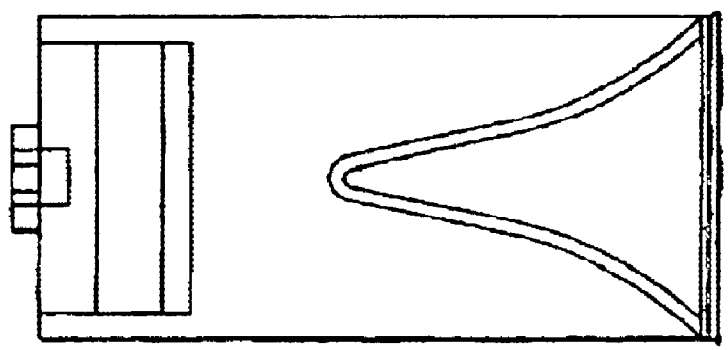

FIGS. 3a through 3c show a variety of shaped-charge liners in cross-section, illustrating the range of such liners a vacuum fixture equipped with the machinable datums of the present invention can accommodate.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A machinable datum for use in a vacuum fixture said vacuum fixture comprising:
   a cylindrical stationary mandrel portion having a central cavity therethrough, and comprising:
      a first end mountable to a machine tool;
      a second end terminating in a contact datum intended for contact with a workpiece; and,
      vacuum means capable of introducing a vacuum into a space between said contact datum and said workpiece;
   a cylindrical plunger portion residing within said central cavity of said cylindrical stationary mandrel portion, said cylindrical plunger portion comprising:
      a first end approximately coextensive with said first end of said stationary mandrel portion, comprising a biasing spring;
      a plunger comprising a cylindrical plunger residing within said central cavity of said cylindrical stationary mandrel portion, and biased away from said first end of said stationary mandrel portion by said biasing spring; and,
      a second end terminating in a contact datum intended for contact with a workpiece;
      and wherein at least one of said contact datums are comprised of an easily machinable material which can be shaped to facilitate contact with a workpiece.

2. The machinable datum of claim 1 wherein the material of which said datums are comprised is copper, or alloys thereof.

3. The machinable datum of claim 1 wherein the material of which said datums are comprised is aluminum, or alloys thereof.

4. A vacuum fixture comprising:
   a cylindrical stationary mandrel portion having a central cavity therethrough, and comprising:
      a first end mountable to a machine tool;
      a second end terminating in a contact datum intended for contact with a workpiece; and,
      vacuum means capable of introducing a vacuum into a space between said contact datum and said workpiece;
   a cylindrical plunger portion residing within said central cavity of said cylindrical stationary mandrel portion, said cylindrical plunger portion comprising:
      a first end approximately coextensive with said first end of said stationary mandrel portion, comprising a biasing spring;
      a plunger comprising a cylindrical plunger residing within said central cavity of said cylindrical stationary mandrel portion, and biased away from said first end of said stationary mandrel portion by said biasing spring; and,
      a second end terminating in a contact datum intended for contact with a workpiece;
      and wherein at least one of said contact datums are comprised of an easily machinable material which can be shaped to facilitate contact with a workpiece.

5. The vacuum fixture of claim 4 wherein the material of which said datums are comprised is copper, or alloys thereof.

6. The vacuum fixture of claim 4 wherein the material of which said datums are comprised is aluminum, or alloys thereof.

* * * * *